June 28, 1955                    J. W. GRAY                    2,711,721
                    LIVESTOCK OPERATED MEDICAMENT DISTRIBUTOR
Filed May 29, 1953                                         2 Sheets-Sheet 1
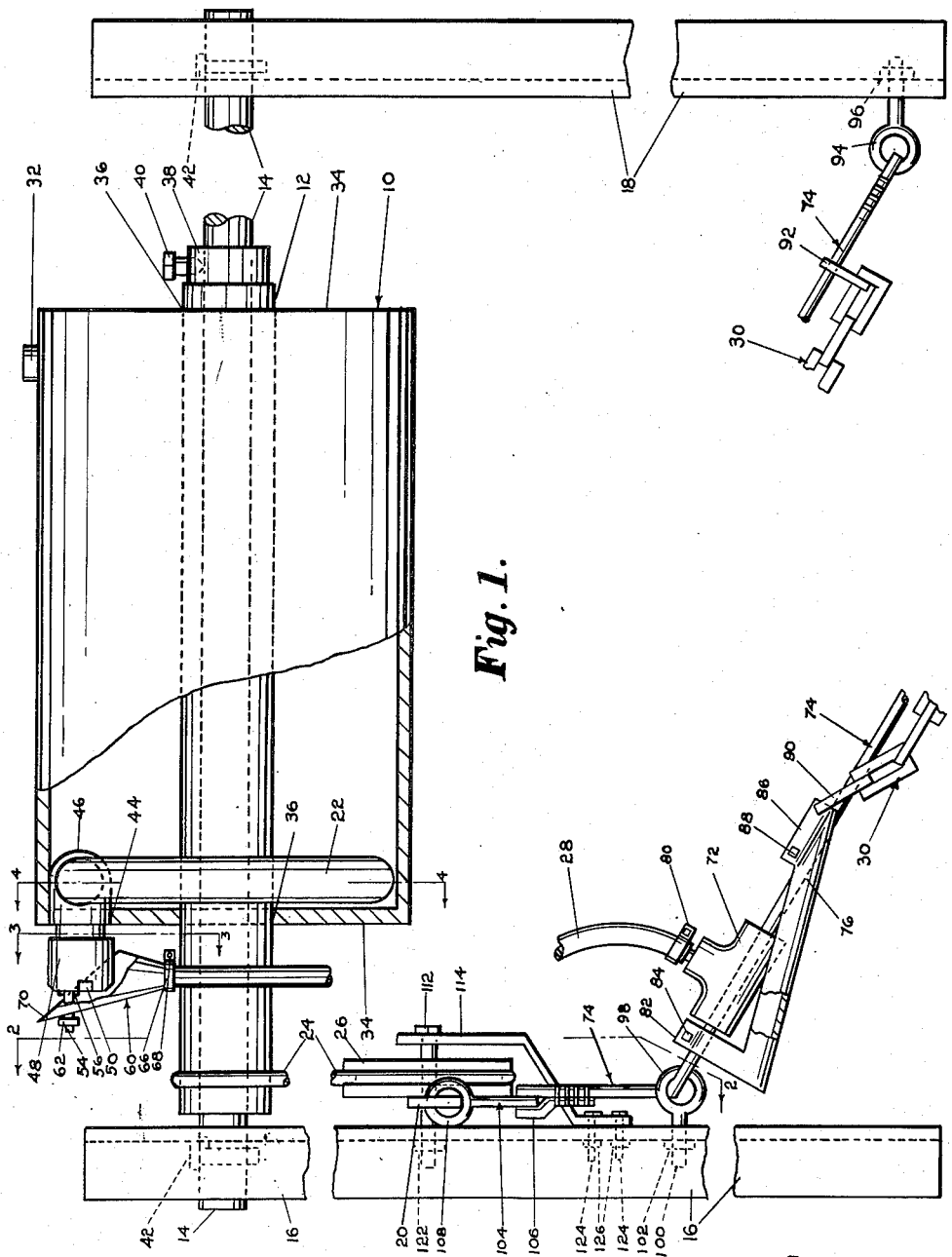
Inventor
James W. Gray
By Arthur H. Sturges.
Attorney June 28, 1955 J. W. GRAY 2,711,721
LIVESTOCK OPERATED MEDICAMENT DISTRIBUTOR
Filed May 29, 1953 2 Sheets-Sheet 2
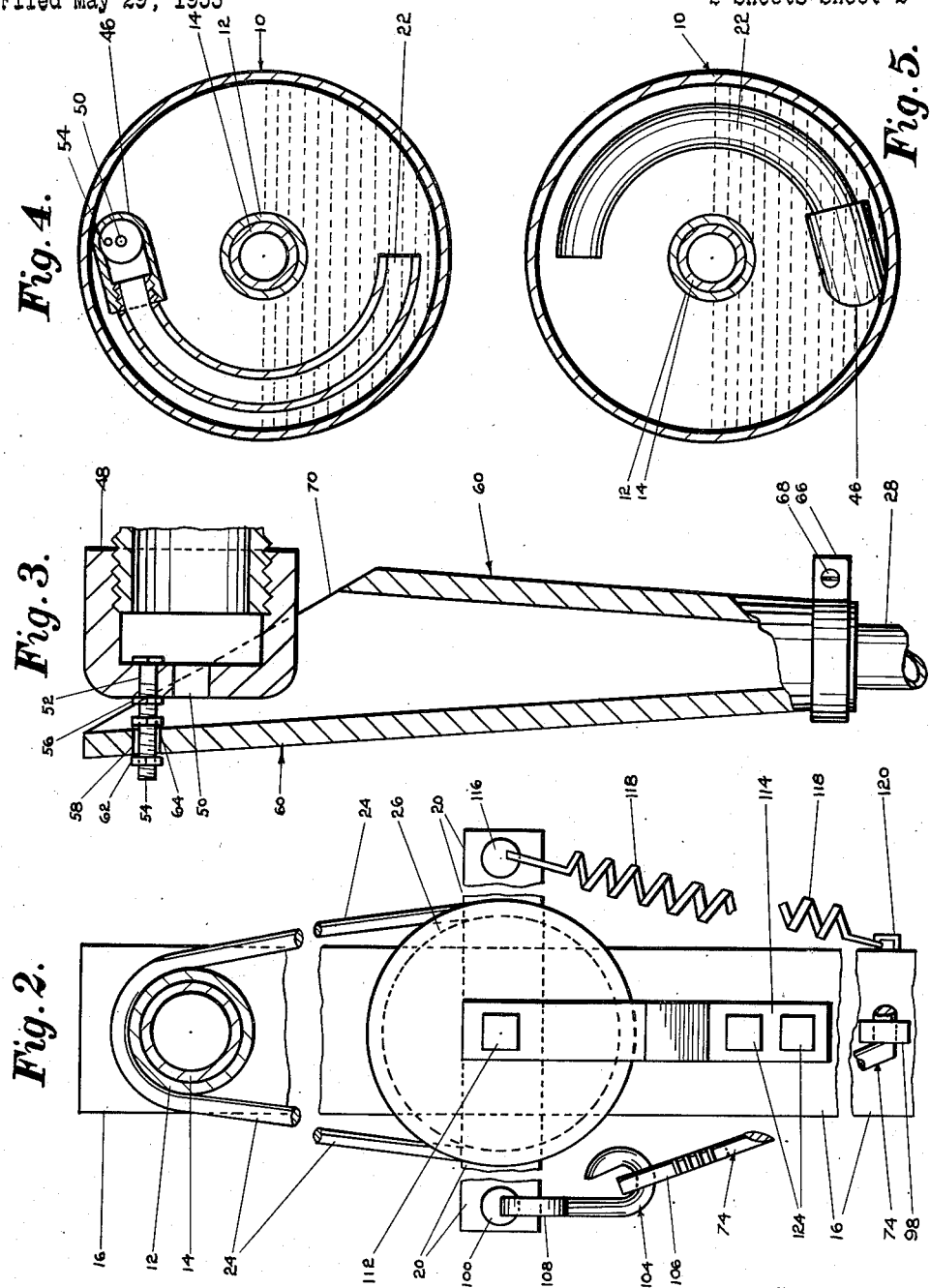
Inventor
*James W. Gray*
By
*Arthur H. Sturges.*
Attorney

United States Patent Office 2,711,721
Patented June 28, 1955

2,711,721
LIVESTOCK OPERATED MEDICAMENT DISTRIBUTOR

James W. Gray, Merriman, Nebr.

Application May 29, 1953, Serial No. 358,477

4 Claims. (Cl. 119—157)

This invention relates to rubbing posts and the like wherein a medicament is applied to an animal as the animal scratches part of its body against a post or chain, and in particular a medicament applicator actuated by a chain or cable suspended between posts whereby movements of the cable upwardly or downwardly, or toward either side are multiplied and transmitted to a container for operating feeding elements thereof so that medicament is deposited upon the back of an animal rubbing against the chain or cable.

The purpose of this invention is to provide means for multiplying the action of an animal rubbing against a chain or the like of a medicament applicator whereby the amount of medicament deposited upon the back of an animal by the device is increased.

Various types of rubbing posts, arches, and other devices have been used for converting the rubbing action of animals into feeding means for applying medicament, oil, and the like to animals, however, the usual rubbing action provides a comparatively short stroke and it has been found difficult to release enough of the medicament or the like to accomplish the result desired. Furthermore it has been found that stock will not scratch their backs on overhanging arches in the summer, and the force resulting from lateral movements, such as rubbing against vertically disposed posts and the like, is not sufficient to operate conventional medicament applicators.

With these thoughts in mind this invention contemplates a combination cable and chain suspended in an inclined position between vertically disposed posts whereby with the upper end of the chain connected to one end of a spring actuated lever an animal rubbing against the chain and cable draws the end of the lever downwardly sufficiently to operate a rotary feeder in a cylindrical container positioned above the chain and cable whereby with the lever connected to the feeder with an endless belt trained over pulleys the ratio of the pulleys may be such that the movement of the feeder is multiplied in relation to the movement of the chain and cable.

The object of this invention is, therefore, to provide a stock medicament applicator that is actuated by stock rubbing any part of their bodies against parts thereof in which lateral travel of parts of the device resulting from the rubbing action is multiplied as it is transmitted to the medicament feeding elements whereby a substantial quantity of the medicament is deposited upon the stock.

Another object of the invention is to provide means for actuating a medicament applicator by rubbing action of stock in which the feeding device of the applicator is operated regardless of whether the rubbing action is laterally or upwardly or downwardly.

Another object of the invention is to provide a medicament applicator for stock in which the medicament is stored in a container that is rotated by the rubbing action of the stock in the applying operation whereby the medicament is retained in an agitated condition which eliminates the use of mechanical agitators or other moving parts for maintaining the medicament in a freely running condition.

Another important object of the invention is to provide a medicament applicator for applying medicament to stock in which all parts operate with a freely moving action whereby wear in the parts is substantially eliminated.

A further object of the invention is to provide a device for applying medicament to stock in which the device, which is actuated by rubbing action of the stock, requires only a very small movement to feed the medicament upon the stock whereby the device is adapted to be actuated by both small and large stock.

In numerous conventional applicators for applying medicament to animals it is required that the animal rub parts of the device with considerable force and as some animals use very little force in rubbing or scratching such devices are not successful. For this reason it is still another object of this invention to provide a medicament applicator in which very little force is required to operate the feeding and depositing instrumentalities.

A further object of the invention is to provide a device, actuated by the rubbing or scratching action of an animal, which applies medicament to the animal, in which a measured amount of medicament is deposited with each operation of the device.

A still further object of the invention is to provide a medicament applicator for stock in which the applicator is of a simple and economical construction.

With these and other objects and advantages in view the invention embodies a cylindrical container journaled on a shaft suspended between posts with a cable having a chain strung thereon also suspended between the posts and positioned below the container, and means for actuating feeding means in combination with the container whereby lateral or vertical movement of the cable and chain deposits measured amounts of medicament upon the chain and cable from which the medicament is supplied to the animals rubbing the chain and cable.

Other features and advantages of the invention will appear from the following description taken in connection with the drawings, wherein:

Figure 1 is a side elevational view of the improved medicament applicator showing the parts assembled, and with parts broken away and also with parts shown in section.

Figure 2 is a vertical sectional view taken on line 2—2 of Figure 1, showing the transmission elements connecting parts against which an animal rubs to a medicament container and feeding elements therein.

Figure 3 is a detail, with the parts shown on an enlarged scale, illustrating the feeding means between the medicament container and flexible hose through which medicament is carried to a chain on a cable which is positioned to be rubbed by an animal desiring to scratch its back.

Figure 4 is a cross section through the medicament container taken on line 4—4 of Figure 1, showing the measuring tube in the inoperative position.

Figure 5 is a cross section similar to that shown in Figure 4, showing the measuring tube in the position of depositing medicament into a funnel of a flexible tube which carries the medicament to parts against which an animal rubs its body.

Referring now to the drawings wherein like reference characters denote corresponding parts the improved device for applying medicament to stock includes a cylindrical container 10 journaled by a sleeve 12 on a shaft 14 mounted in the upper ends of uprights 16 and 18, a lever 20 for transmitting movements of a cable suspended between the uprights to a feeding and measuring tube 22 positioned in one end of the container through a belt 24 trained over the sleeve 12 and a pulley 26 on the lever, and a flexible tube 28 for carrying medicament from the tube 22 to the cable and also to a chain 30 through which the cable extends.

The container 10, which is provided with a filling plug 32, is formed with ends 34 through which the sleeve 12 extends, the sleeve being secured, preferably by welding, in openings 36 in the ends 34, whereby the ends of the container are sealed, and the sleeve with the container thereon is retained in position adjacent the upright 16 with a set collar 38 having a set screw 40 therein. The shaft 14 is retained in position in the uprights by pins 42.

The feeding and measuring tube 22 is threaded into one end of a fitting, such as an elbow, and the elbow, which is welded in an opening 44 in one end of the container, and which is indicated by the numeral 46, is threaded into a cap 48 that is provided with an outlet opening 50 and also an opening 52 in which a pivot bolt 54 is secured by a nut 56. The bolt 54 is pivotally secured in an opening 58 of a funnel 60 with lock nuts 62 and 64, and the flexible tube 28 is secured to the lower end of the funnel with a clamp 66 having a screw 68 extended through flanges thereof.

The upper end of the funnel 60 is formed with a beveled surface 70 providing an opening into which the cap 48 extends and medicament supplied to the funnel through the cap flows through the tube 28 into a T 72 on the cable, which is indicated by the numeral 74, and from the T to a trough 76, from which the medicament flows to the chain 30 and cable. The tube 28 is secured to a nipple 78 extended from the T 72 by a clamp 80. The upper end of the trough 76 is provided with ears 82 that straddle the cable 74 and the trough is held in position by a bolt 84 which extends through the ears. Similar ears 86 extend from the lower end of the trough and a bolt 88 extended through the ears 86 retains the lower end of the trough on the cable.

An upper link 90 of the chain extends through the ears 86 of the trough and a link 92, at the lower end of the chain is positioned over the cable. The cable is also threaded through the chain at intermediate points so that the chain is retained in close proximity to the cable.

The lower end of the cable is secured to an eye bolt 94 that is held in the upright 18 with a nut 96, and the upper part of the cable extends through an eye 98 of an eye bolt 100 which is held in the upright 16 with a nut 102. From the eye 98 the cable extends to a hook 104 which extends through a loop 106 on the end of the cable, and an eye 108 of the hook is held in an opening 110 in one end of the lever 20. The lever 20 which is secured to the pulley 26, is pivotally mounted on a bolt 112 that extends from a bracket 114 to the upright 16, and the end of the lever opposite to that in which the opening 110 is positioned is provided with an opening 116 in which one end of a spring 118 is secured. The opposite end of the spring 118 is attached to one side of the upright 16 with a bolt 120. The bolt 112, which extends from the upper end of the bracket 114 to the upright is held in the upright with a nut 122, and the lower end of the bracket is secured to the upright with bolts 124 which are provided with nuts 126.

With the parts assembled in this manner and with cattle or other stock attracted to the device by a salt lick or feed the stock will be induced to rub against the chain or cable and as the cable is pushed laterally, or upwardly or downwardly a pull will be transmitted to the lever 20 which will rotate in a counter-clockwise direction, from that shown in Figure 2, whereby the pulley 26, being larger than the sleeve 12 will rotate the sleeve and medicament container 10 and the tube 22, passing from the position shown in Figure 4 to that shown in Figure 5, will scoop up the medicament. With the tube 22 in the position shown in Figure 5 the medicament will flow through the passage 50 in the cap 48 and flow through the funnel 60 to the tube 28 and from the fitting 72 at the lower end of the tube to the trough and from the trough to the cable and chain. The stock rubbing against the chain and cable will wipe the medicament therefrom and as the animal rubs with the itching or irritated part of the body the medicament is directly applied to the proper part of the body of the animal.

The lower ends of the uprights or standards 16 and 18 will be supported by suitable foundations and the heighth of the container 10, and also the positions of the cable and chain may be adjusted to correspond with the stock for which the applicator is intended.

From the foregoing description it is thought to be obvious that a medicament distributor for live stock constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. A medicament applicator for livestock comprising a horizontally positioned cylindrical container, spaced standards between which the container is positioned, a shaft mounted in the upper ends of the standards, a sleeve extended through the container and journaled on the shaft, an arcuate measuring tube positioned in and extended through one end of the container, a cable suspended in an inclined position between the standards, a chain on the cable, a bolt mounted on the standard at the high end of the cable, a pulley on said bolt, a belt trained over said pulley and also over the sleeve extended through the container and journaled on the shaft, a lever pivotally mounted by the bolt on the standard, one end of the lever being connected to and adapted to be actuated by the cable for turning the container for feeding medicament through said measuring tube from the container to the cable and chain as an animal pushes the intermediate portion of the cable between the standards out of alignment with the ends thereof, the quantity of medicament fed to the cable and chain being determined by the measuring tube.

2. A medicament applicator for livestock comprising a cylindrical container, spaced uprights between which the container is positioned, means for rotatably mounting the container in the uprights, a lever pivotally mounted on one of the uprights, a cable suspended between the uprights and connected to one end of the lever, a pulley positioned on the upright and adapted to be actuated by the lever, a belt trained over the pulley and also over the rotatable mounting means of the container for turning the container and also measuring means therein for feeding medicament from the container to a funnel through which the medicament flows to the cable as the intermediate part of the cable between the uprights is bulged from a straight line, and resilient means for returning the lever and cable and for maintaining tension in the cable.

3. In a device for applying medicament to livestock, the combination which comprises a horizontally disposed container, spaced standards between which the container is positioned, a sleeve extended through the container, a shaft extended through the sleeve and mounted in the standards, a lever pivotally mounted on one of the standards, a pulley carried by the lever, a belt trained over the pulley and sleeve for rotating the sleeve and container by the lever, a cable extended from one end of the lever and suspended between the standards, a chain on the cable, a spring for urging the lever against the force of the cable whereby tension is retained in the cable, and means for feeding medicament from the container to the cable and chain upon movement of the intermediate portion of the cable between the standards from a straight line.

4. In a device for applying medicament to livestock, the combination which comprises a horizontally disposed cylindrical container, a sleeve extended through the container and secured in ends thereof, a shaft extended through the sleeve and upon which the sleeve and container are journaled, spaced standards in the upper ends of which the ends of the shaft are mounted, an arcuate measuring tube positioned in one end of the container and extended through said end, a lever pivotally mounted on the standard at the end of the container through which the said tube extends, a cable suspended between the standards and connected to one end of the lever, a spring connected to the opposite end of the lever and also to the standard upon which the lever is mounted, a pulley attached to the lever, a belt trained over the pulley and also over the sleeve extended through the container, a funnel positioned to receive medicament from the end of the measuring tube extended through the end of the container, a flexible tube extended from the funnel to the cable, and a chain through which the cable is threaded.

References Cited in the file of this patent
UNITED STATES PATENTS

| | | |
|---|---|---|
| 1,284,700 | Johnson | Nov. 12, 1918 |
| 1,492,142 | Shoemaker | Apr. 29, 1924 |
| 1,577,938 | Stanton | Mar. 23, 1926 |
| 2,581,028 | Kirk | Jan. 1, 1952 |